United States Patent [19]

Moriya

[11] Patent Number: 4,492,411
[45] Date of Patent: Jan. 8, 1985

[54] BRAKE PRESSURE CONTROL VALVE WITH A DISABLER FOR SPLIT BRAKING SYSTEM

[75] Inventor: Michio Moriya, Itami, Japan

[73] Assignee: Sumitomo Electric Industries, Ltd., Japan

[21] Appl. No.: 435,891

[22] Filed: Oct. 21, 1982

[30] Foreign Application Priority Data

Oct. 29, 1981 [JP] Japan .............................. 56-174048
Apr. 22, 1982 [JP] Japan ............................ 57-59075[U]
Apr. 22, 1982 [JP] Japan ............................ 57-59076[U]

[51] Int. Cl.³ .......................... B60T 8/26; B60T 11/34; B60T 17/18
[52] U.S. Cl. .................................... 303/6 C; 188/349
[58] Field of Search .................. 303/6 C, 6 R, 22 R, 303/22 A, 24 A, 24 F, 24 C, 24 R, 84 A, 84 R; 188/349, 195

[56] References Cited

U.S. PATENT DOCUMENTS

| | | | |
|---|---|---|---|
| 3,627,385 | 12/1971 | Stokes | 303/6 C |
| 3,661,426 | 5/1972 | Tam | 303/6 C |
| 3,958,838 | 5/1976 | Totschnig | 303/6 C X |
| 3,969,000 | 7/1976 | Ohta et al. | 303/6 C |
| 4,311,345 | 1/1982 | Schopper | 303/6 C X |
| 4,317,598 | 3/1982 | Tandler | 303/6 C |
| 4,422,694 | 12/1983 | Schopper et al. | 303/84 A |

FOREIGN PATENT DOCUMENTS

| | | | |
|---|---|---|---|
| 2833178 | 2/1980 | Fed. Rep. of Germany | 303/6 C |
| 0040162 | 4/1978 | Japan | 303/6 C |
| 0066061 | 4/1982 | Japan | 303/6 C |
| 0167856 | 10/1982 | Japan | 303/6 C |
| 0167857 | 10/1982 | Japan | 303/6 C |
| 2112887 | 7/1983 | United Kingdom | 303/6 C |

Primary Examiner—Douglas C. Butler
Attorney, Agent, or Firm—Harness, Dickey & Pierce

[57] ABSTRACT

A brake pressure control valve for a diagonal brake circuit having two pressure regulating valves is proposed. If one of two brake lines fails, the pressure regulating valves are adapted to be made inoperative so that the brake pressure will not be reduced. The valve head on the plunger passes through a lip seal of an elastic material.

3 Claims, 11 Drawing Figures

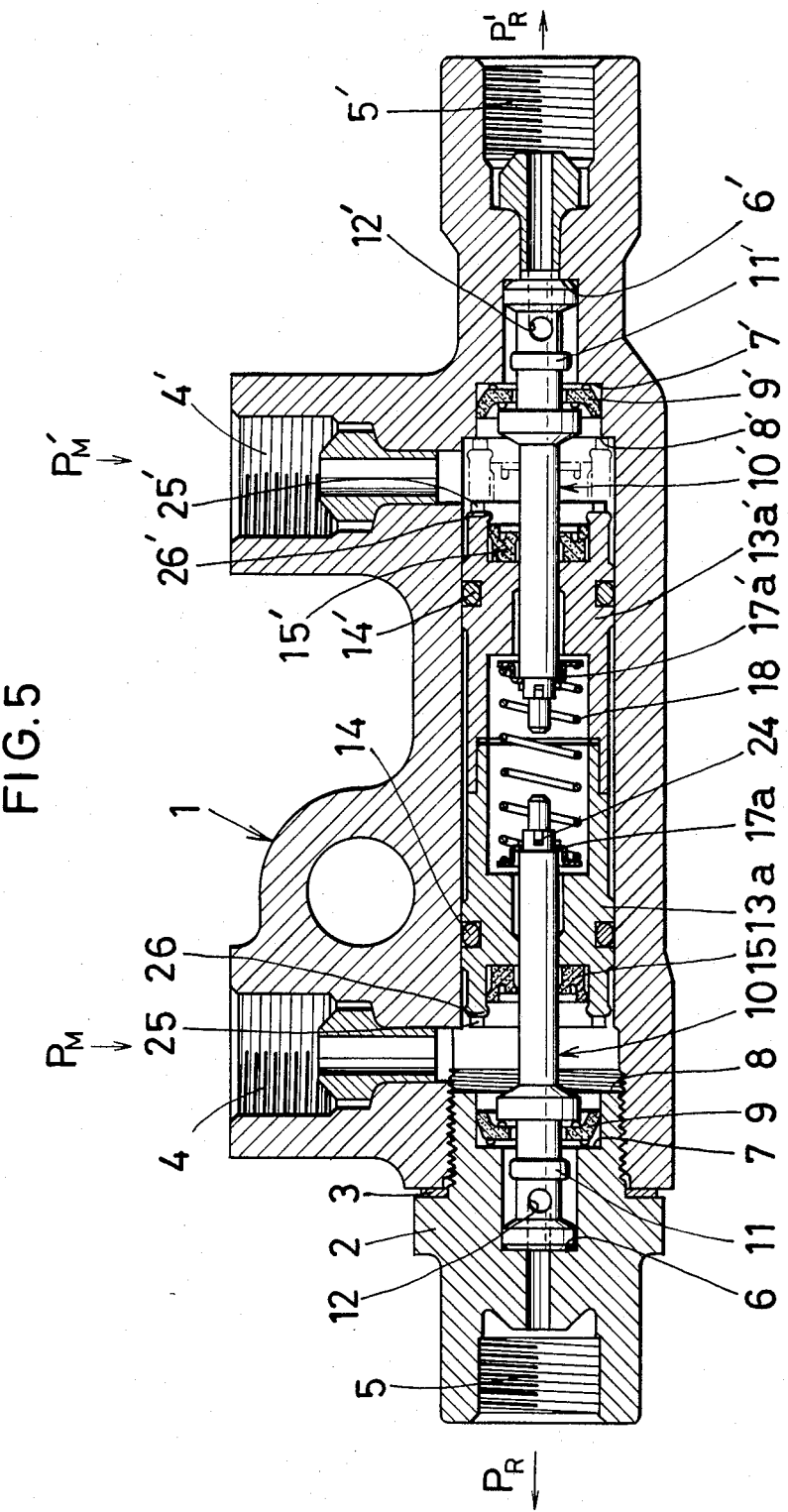

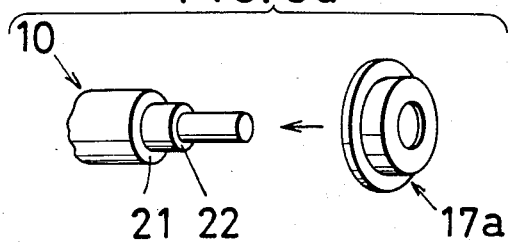
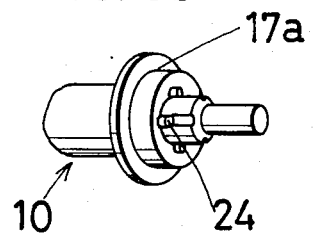
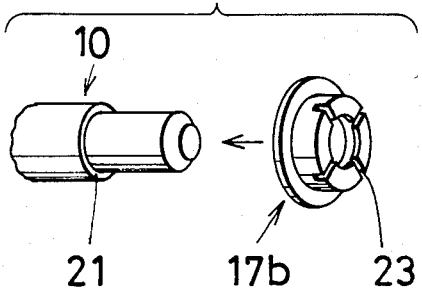
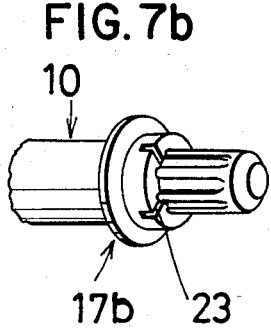
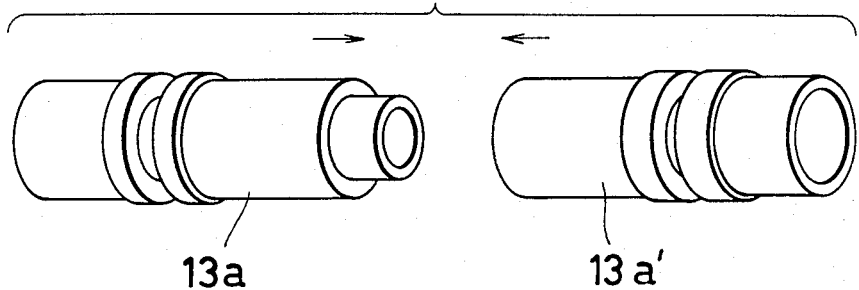
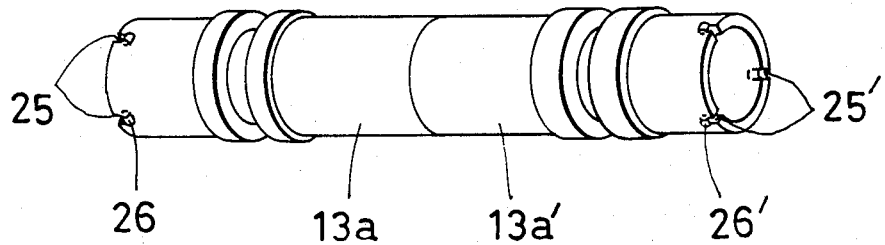

BRAKE PRESSURE CONTROL VALVE WITH A DISABLER FOR SPLIT BRAKING SYSTEM

The present invention relates to a brake pressure control valve used in diagonal brake fluid circuits in motor vehicles.

In hydraulic brake systems particularly for automobiles, what is called the proportioning valve (or pressure regulating valve) is used to achieve a proper distribution of the braking force to the front and rear brakes. The valve starts to regulate the fluid pressure $P_R$ to the rear brakes after the fluid pressure $P_M$ from the master cylinder has exceeded a certain pressure $P_N$ (reduction start pressure), so that the pressure $P_R$ to the rear brakes will increase not at the same rate as the fluid pressure $P_M$, but at a lower rate, as shown in FIG. 2 with a solid line A. This is called the proportioning action.

On the other hand, it is customary to use a dual system for the piping leading from the master cylinder to the front and rear brakes, in order to ensure safety. In this case, the diagonal split system is sometimes used in which a pair of the front and rear wheels at the opposite sides are supplied with the brake fluid from the same line, as shown in FIG. 1.

In this system, one pressure regulating valve is required for each line. Thus, two valves are required in all. They are usually contained in a single body to save the mounting space and the cost. In FIG. 1, numeral 31 denotes front wheel, 32 master cylinder, 33 pedal, 34 rear wheel, 35 brake for rear wheel, 36 piping, and 37 pressure regulating valve.

In the diagonal split system, it is required that if one brake line fails, the pressure regulating valve in the other line stops the proportioning action so that the brake fluid will be supplied to the rear brakes with the same fluid pressure as to the front brakes as shown in FIG. 2 in a dotted line B.

An object of the present invention is to provide a brake pressure control valve for a diagonal brake circuit which has the abovementioned function and is simple in construction and inexpensive.

Other objects and features of the present invention will become apparent from the following description taken with reference to the accompanying drawings, in which FIG. 1 is a schematic view showing a brake fluid line of the diagonal split type;

FIG. 5 is a sectional view of the third embodiment;

FIGS. 6(a), 6(b) and 7(a), 7(b) are perspective views how two examples of spring retainers are secured on the plunger; and FIGS. 8(a), 8(b) represent a perspective view of the pistons used in the third embodiment.

Figure 1:
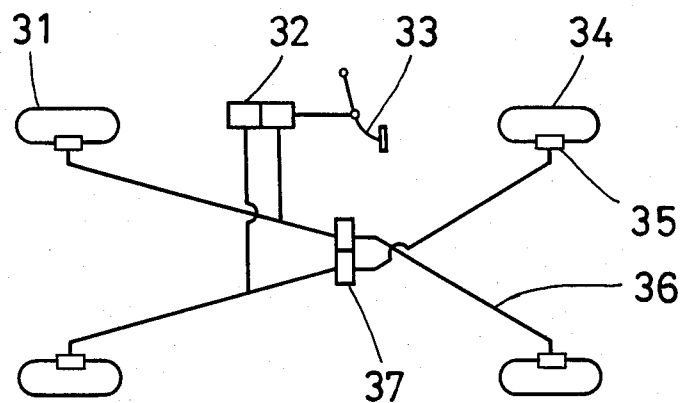
Figure 2:
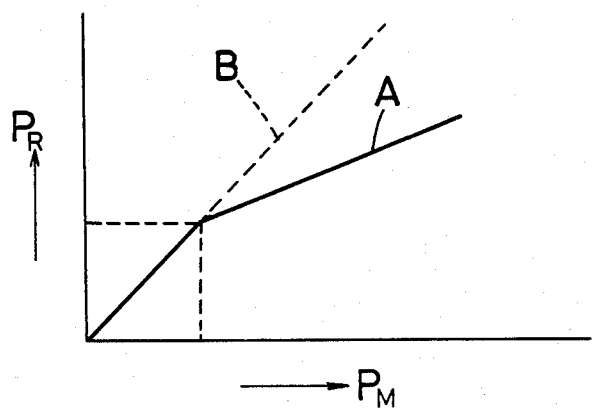
FIG. 2 is a graph of inlet pressure vs. pressure supplied to the brake.
Figure 3:
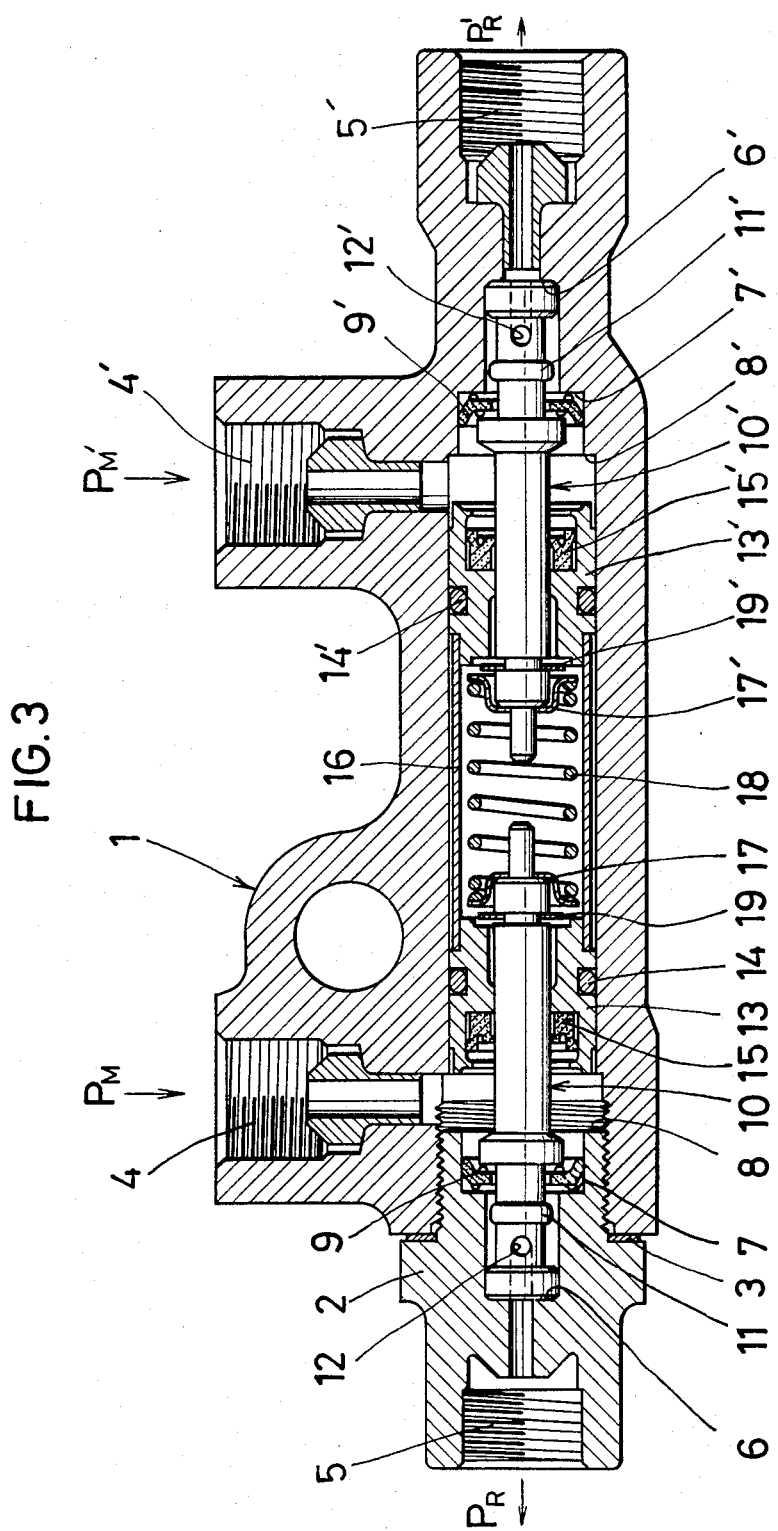
FIG. 3 is a sectional view of the first embodiment of this invention.

Referring to FIG. 3 showing the first embodiment of this invention, the valve comprises a valve body 1 and a plug 2 screwed into the valve body with a packing 3 therebetween. The valve has a fluid inlet 4 and an outlet 5 for the first line and another inlet 4' and outlet 5' for the second line. The fluid inlets 4, 4' are connected to the master cylinder of the vehicle and the fluid outlets 5, 5' are connected to the brakes for the rear wheels.

The valve body 1 is formed with a stepped bore which is substantially symmetrical and has different sectional areas $S_1$, $S_2$, $S_3$. These portions of different sectional areas end with seats 6, 6' for plunger, seats 7, 7' for lip seal and seats 8, 8' for piston, respectively.

Plungers 10, 10' extend through lip seals 9, 9' held on the lip seal seats 7, 7' having a sectional area $S_2$, respectively. The plungers have valve heads 11, 11' of a sectional area $S_4$ and fluid ports 12, 12' at their one end, respectively. Their one end is held in a cylindrical portion with a sectional area $S_1$ and their other end is held in a bore (with a sectional area $S_5$) of pistons 13, 13' slidably fitting in cylindrical portions with a sectional area $S_3$.

O rings 14, 14' and cup seals 15, 15' are provided for seal between the pistons 13, 13' and the cylindrical portion with a sectional area $S_5$ and between the pistons and the plungers 10, 10'. Between the pistons 13, 13' there is provided a sleeve 16 which is almost in contact with the inner wall of the cylindrical portion $S_3$ and has its both ends supported by the pistons.

The space defined by the plungers 10, 10', pistons 13, 13' and sleeve 16 accommodates a spring 18. The spring is held between spring retainers 17, 17' secured to the plungers 10, 10' to urge the plungers against the seats 6, 6', respectively. Also, snap rings 19, 19' are fixedly mounted on the plungers 10, 10' to move them forcibly as the pistons 13, 13' move.

Overall operation will be described below mainly for the first line at the left side of the valve in FIG. 3. Since the valve of this invention is axially symmetrical, the same is true with the second line at the right side of the valve.

Firstly, if the fluid pressure is normal, the valve will operate as follows.

The brake fluid from the master cylinder (with pressure $P_M$, $P_{M'}$) is supplied to the inlets 4, 4'. Since $P_M = P_{M'}$ when normal, the pistons 13, 13' will stand still because the pressures balance at both sides of the sleeve 16.

Until $P_M$ reaches to a certain value, the brake fluid passes between the lip seal 9 and the plunger 10 through the fluid port 12 to the outlet 5, then to the brake for the rear brakes. In this state, supposing that the pressure at the outlet is $P_R$, $P_R = P_M$.

Since the outer diameter of the valve head 11 of the plunger 10 is slightly greater than the inner diameter of the lip seal 9, the fluid is sealed when the valve head engages the lip seal. Now, let us consider the balance of pressures applied to the plunger 10. Supposing that the set load of the spring 18 is denoted as F when the fluid is sealed by engagement of the valve head against the lip seal, the pressure working leftwardly in FIG. 3 is $P_M(S_4 - S_5) + F$ and the pressure working rightwardly is $P_R S_4$. Thus, when $P_M$ exceeds a certain value (reduction start pressure $P_N = F/S_5$), $P_R$ will be $(1 - S_5/S_4)P_M + F/S_4$, so that the rate of pressure increase at the outlet 5 will be less than that at the inlet 4. In other words, the valve starts to perform what is called the proportioning action.

If one of the two lines should fail, the valve will operate as follows. Suppose that the first line is normal and the second line fails. Then, $P_{M'} = 0$. When the brake fluid under pressure $P_M$ is supplied to the inlet 4, the piston 13 tends to move under the fluid pressure, urging the sleeve 16, piston 13' and snap ring 19 rightwardly.

Since the snap ring 19 is fixedly mounted on the plunger 10, when $P_M$ exceeds a certain pressure, the piston 13 pushes rightwardly the spring 18 together with the sleeve 16 and the piston 13' through the snap ring 19, plunger 10 and spring retainer 17 against the bias of the spring.

The piston 13 moves rightwardly until the piston 13' abuts the seat 8'. When the plunger moves to the right, the valve head 11 on the plunger passes through the lip seal 9 because the lip seal is made of an elastic material such as rubber. Although the valve head 11 is located to the left of the lip seal 9 in the normal state shown in FIG. 3, if the second line fails with only the first line operating normally, the valve head will come to the right of the lip seal 9.

In this state, the valve will not perform such a proportioning action as when normal so that the brake fluid will flow between the lip seal 9 and the plunger through the port 12 to the outlet 5 without undergoing any pressure reduction. Now, $P_M = P_R$. This means that the control valve according to the present invention operates satisfactorily even if one of the two lines should fail.

At the instant the valve head 11 passes through the lip seal 9, the fluid is sealed so that the pressure $P_R$ will not increase. However, the time while it is sealed is very short, and is practically negligible.

It will be apparent from the drawings that with no fluid pressure applied all the parts will go back to their original position in FIG. 3 under the bias of the spring 18.

Figure 4:
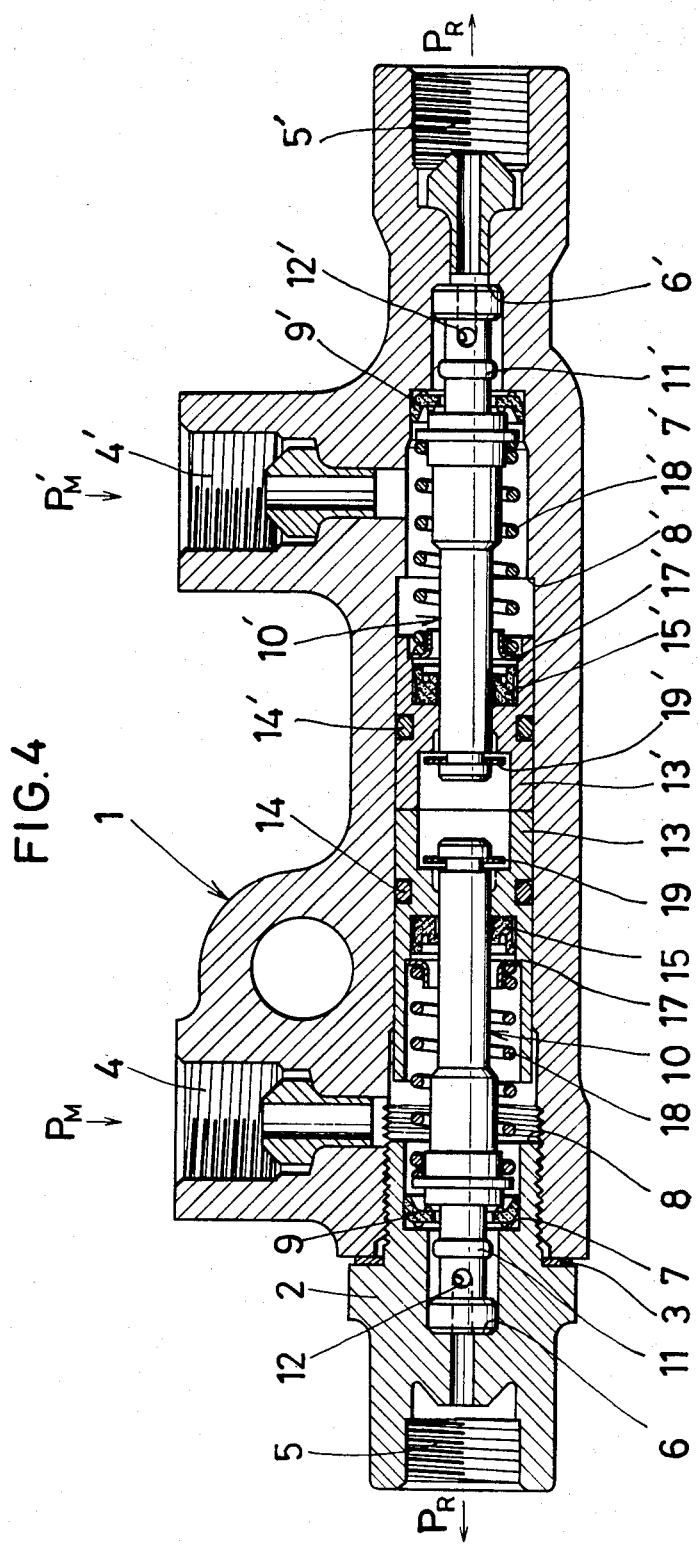
FIG. 4 is a sectional view of the second embodiment.

Referring to FIG. 4 showing another embodiment, it is basically the same as the first embodiment except that two springs 18, 18', one for each line, are employed instead of one spring for two lines.

FIG. 5 shows the third embodiment in which two snap rings and a sleeve used in the first embodiment are omitted. Instead the spring retainers caulked on the plungers serve to transmit the movement of the pistons to the plungers.

Referring to FIG. 6, the plunger 10 is formed at inner end thereof with two shoulders 21, 22. A spring retainer 17' in the form of a cap is mounted on the first shoulder 21 of the plunger and the second shoulder is deformed by caulking to form stopper portions 24, thereby preventing the retainer from getting off.

Referring to FIG. 7, the plunger 10 is formed at its inner end with a single shoulder 21 on which a spring retainer 17b is tightly mounted. The spring retainer is formed with radial slits 23 to give it resilience, thereby preventing it from getting off.

Although two examples of spring retainers have been shown, they may be secured on the plunger in any other ways.

The third embodiment in which the spring retainers of FIG. 6 are used is shown in FIG. 5. In this embodiment, a piston 13a is in two parts to facilitate the mounting of the spring 18 and the spring retainers 17'. In the assembly, the spring retainers are secured on the plungers and the spring is mounted between the spring retainers. The piston consisting of two parts is then pressed on the plungers. The assembly is mounted in the valve body 1 with one lip seal 9 held therein. Finally, the plug 2 for supporting the other lip seal is mounted on one end of the valve body so as to be liquid tight.

The third embodiment is substantially the same in construction and operation as the first embodiment except that the movement of the piston is transmitted through the spring retainers to the plungers.

One difference and advantage of the third embodiment from and over the first and second embodiments are that two snap rings and a sleeve used in the latter are omitted.

Referring to FIG. 8, each piston is formed at its outer end with a plurality of notches 25 and projections 26 so as to be disposed outside of the cup seals 15. The notches serve as an air leak hole for the inoperative line and the projections serve to prevent the cup seals 15 from coming off. The latter makes it possible to omit any holder for the cup seal.

The notches and projections may be formed by machining. However, they may be formed by means of a wedge secured on a press jig, when pressing the piston into the valve body. The projections are formed by plastic deformation of the piston which occurs in the formation of the notches.

What are claimed are:

1. In a brake pressure control valve with a disabler for a split braking system having two brake circuits having a valve body having two pairs of fluid inlets and outlets and formed with a bore connecting said inlets with said respective outlets, a pair of pressure reducing valves disposed in an opposed relationship and each having a round valve seat of an elastic material mounted in a fixed position with respect to said valve body and a plunger slidably mounted in said valve body and formed with a valve head thereon, at least one spring for urging said plungers in such a direction that the respective of said pressure reducing valves will open, and piston means slidably mounted on said plungers at inner end thereof, said piston means being in a neutral balanced position when the fluid pressure in one brake circuit is substantially equal to that in the other brake circuit and being movable toward the circuit that failed, if one brake circuit should fail, the improvement comprising engaging means for bringing said piston means into engagement with said plunger in the live circuit when said piston means has moved toward the failed circuit for a predetermined distance, whereby forcibly moving said plunger in the live circuit toward the failed circuit, so that the valve head on said plunger in the live circuit will pass through said valve seat and thus said pressure reducing valve in the live circuit is disabled.

2. The brake pressure control valve as claimed in claim 1, wherein said engaging means comprise an enlarged portion provided on the inner end of each plunger, said enlarged portion being of a larger diameter than the inner diameter of said piston means for engagement thereof with said piston means.

3. The brake pressure control valve as claimed in claim 1, wherein said engaging means comprise a spring retainer fixedly mounted on the inner end of said each plunger for supporting said spring, said spring retainer being of a larger diameter than the inner diameter of said piston means for engagement thereof with said piston means.

* * * * *